UNITED STATES PATENT OFFICE.

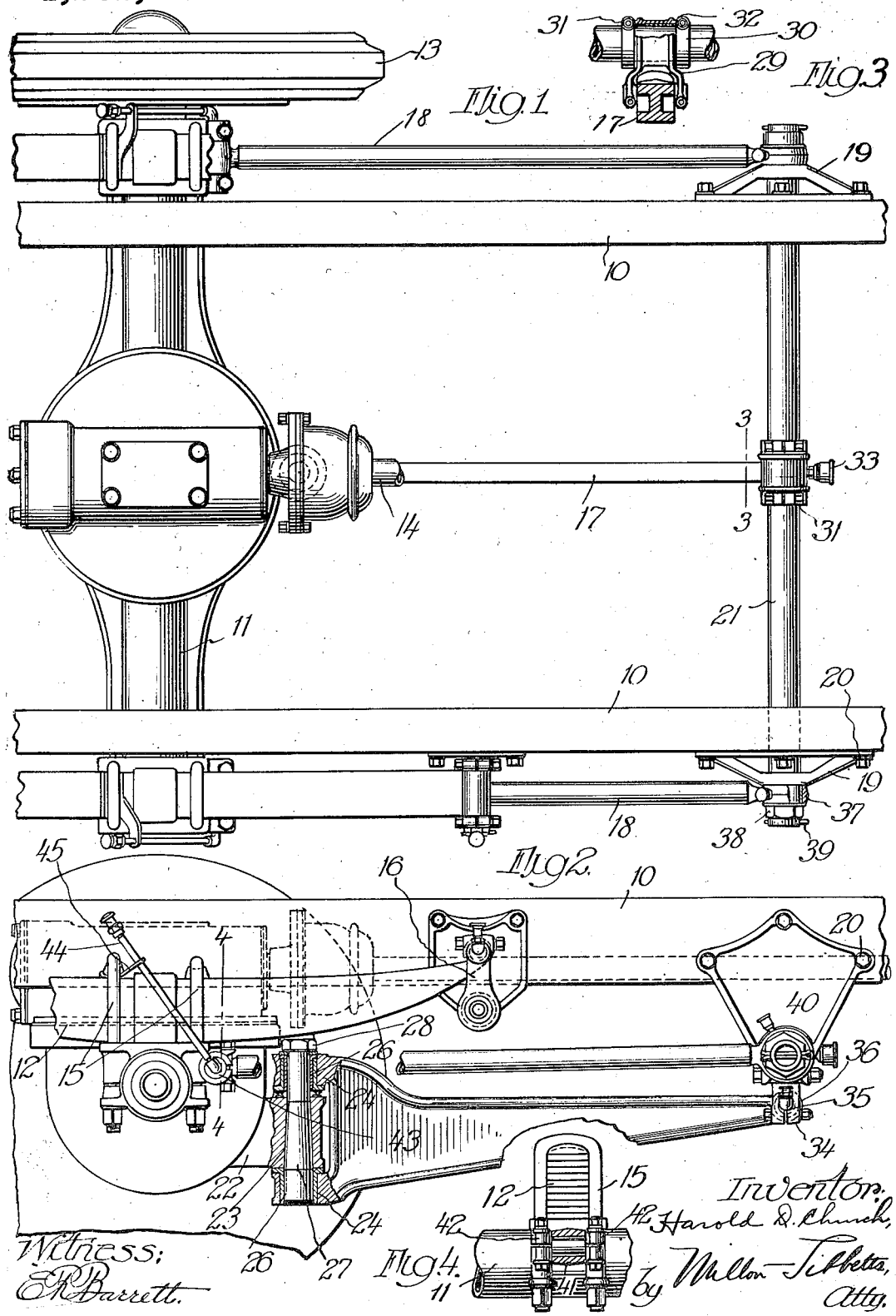

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,262,921.   Specification of Letters Patent.   Patented Apr. 16, 1918.

Application filed May 19, 1916. Serial No. 98,542.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to an improvement in motor vehicles and particularly to the rear axle construction.

One of the objects of the invention is to yieldingly and yet securely connect the driving axle with the frame.

Another object of the invention is to so secure the rear axle that any turning thereof in a plane parallel to the frame is prevented, without any limitation of the yielding movement due to the springs.

Another object of the invention is to provide a single cross tube to which the torque arm and distance rods are pivotally connected.

Further objects of the invention will appear from the following description taken in connection with the accompanying drawings which form a part of this specification, and in which:—

Figure 1 is a plan view of part of a motor vehicle embodying this invention;

Fig. 2 is a side elevation; and

Figs. 3 and 4 are detail views taken on the lines 3—3 of Fig. 1, and 4—4 of Fig. 2, respectively.

In the drawings, 10 designates the frame side members of a motor vehicle and 11 a driving axle on which the frame is mounted through springs 12. The vehicle is provided with wheels 13, one only being shown, and a propeller shaft 14 which drives the rear axle. The springs 12 are secured, intermediate their length, to the axle by clips 15 and are connected at each end to the frame by spring shackles 16. The forward pair only of these shackles are shown but it will be understood that the rear pair are similarly made so that the frame can swing relatively to the axle.

A torque arm 17 and distance or radius rods 18 are connected to the vehicle frame and the rear axle. Brackets 19 mounted outside the frame side members by bolts 20 rigidly support a tube 21, hereinafter referred to as the cross tube. The forward ends of the torque arm and distance rods are pivoted to the cross tube while the rear ends are pivoted to the driving axle. The torque arm 17 is pivoted horizontally on the cross tube and vertically on the axle so as to allow for the vibration of the axle and at the same time counteract the driving torque. A lug 22, here shown as integral with the axle 11, projects forwardly from the axle and is provided with a tapered opening 23. At the rear end of the torque arm are parallel ears 24 which engage above and below the lug 22 and are provided with openings 26 in alinement with the opening 23. A tapered bolt 27 is inserted through the openings and is held in position by a nut 28.

On the cross tube 21 and intermediate the frame side members 10 is a link 29 held from longitudinal movement on the cross tube by collars 30 each clamped in place by nut and bolt 31. The link 29 is provided with a bushing 32 and a grease cup 33 to insure easy oscillation on the cross tube. At the lower end of the link are projecting split rings 34 through which a pin 35, having an oiler, is inserted and clamped in position. The front end of the torque arm is provided with an eye 36 which pivots on the pin 35 between the rings 34.

The distance or radius rods 18 are horizontally pivoted to both the axle casing and the cross tube by the following means: At the front end of each rod is a ring 37 which surrounds the end of the cross tube and is held in place by a nut and washer 38, a cotter pin 39 holding the nut against unscrewing. By this construction the distance rods are pivotally mounted on the cross tube, a grease cup 40 being provided to lubricate the bearing surface of the tube. The rear ends of the distance rods are pivoted to the axle casing, the rear end of each distance rod comprising a ring 41, which may or may not be integral. Mounted on each clip 15 are horizontally separated split rings 42 between which the ring 41 is arranged. A pin 43 passing through the split rings 42 and ring 41 holds the latter in position. The pin is clamped in the split rings in the usual way and being smaller in diameter than the opening of the ring 41 permits oscillation of the rod relative to the split rings and shackle. At the end of the pin is provided an oiler 44 held in position by the bent plate 45 through which it passes, said plate being held upon the spring 13 by the clip 15.

While only one form of this invention has been shown and described in detail it is obvious that other modifications may be made without departing from the spirit or scope of the invention.

Having thus described my invention, what I claim and desire to secure by Letters Patent is:—

1. In a motor vehicle in combination a frame, a driving axle, springs on said axle pivotally supporting said frame, a torque arm and distance rods connected to said axle and a single cross tube mounted on said frame and to which said torque arm and distance rods are connected.

2. In a motor vehicle in combination a frame, a driving axle, springs on said axle pivotally supporting said frame, a torque arm and distance rods pivotally connected to said axle and a single cross tube fixedly mounted on said frame and to which said torque arm and distance rods are pivotally connected.

3. In a motor vehicle in combination a frame, a driving axle, springs on said axle for supporting said frame, clips for securing said springs to said axle, a torque arm pivotally connected to said axle, distance rods pivoted to said clips below said springs and a cross tube mounted on said frame to which said torque arm and distance rods are pivotally connected.

4. In a motor vehicle in combination frame members, a driving axle, springs on said axle outside said members for pivotally supporting the same, a torque arm connected to said axle between said members, distance rods connected to said axle outside said members and a single cross tube mounted on said frame to which said torque arm and distance rods are connected.

5. In a motor vehicle in combination, frame members, a driving axle, springs on said axle outside said frame members for pivotally supporting the same, clips for securing said springs to said axle, a torque arm vertically pivoted to said axle between said frame members, distance rods horizontally pivoted to said clips outside said frame members and below said springs and a tube transversely mounted on said frame members to which said torque arm and distance rods are each horizontally pivoted the torque arm being between and the distance rods outside said frame members.

In testimony whereof I affix my signature.

HAROLD D. CHURCH.